United States Patent [19]

O'Neill

[11] Patent Number: 4,766,850
[45] Date of Patent: Aug. 30, 1988

[54] METHOD AND APPARATUS FOR COLLECTING AND CONVEYING OBJECTS FROM A SURFACE

[75] Inventor: James J. O'Neill, County Down, Great Britain

[73] Assignee: Tamnaharry Developments Limited, Lisburn, Great Britain

[21] Appl. No.: 732,296

[22] Filed: May 9, 1985

[30] Foreign Application Priority Data

May 11, 1984 [GB] United Kingdom ............. 8412019

[51] Int. Cl.⁴ ............................................. A01K 29/00
[52] U.S. Cl. ........................................................ 119/82
[58] Field of Search ....................... 119/82; 56/328 R

[56] References Cited

U.S. PATENT DOCUMENTS

| | | | |
|---|---|---|---|
| 3,021,588 | 2/1962 | Ledwell, Jr. | 119/82 |
| 3,107,475 | 10/1963 | Gustafson | 56/328 R |
| 3,672,335 | 6/1972 | Sanders | 119/82 |
| 3,702,600 | 11/1972 | Bright et al. | 119/82 |
| 3,722,477 | 3/1973 | Weldy et al. | 119/82 |
| 4,037,565 | 7/1977 | Ledwell, Jr. | 119/82 |
| 4,467,745 | 8/1984 | Ledwell et al. | 119/82 |
| 4,567,852 | 2/1986 | Ledwell et al. | 119/82 |
| 4,569,308 | 2/1986 | O'Neill et al. | 119/82 |
| 4,600,351 | 7/1986 | Nelson | 119/82 X |

*Primary Examiner*—Robert P. Swiatek
*Assistant Examiner*—David L. Tarnoff
*Attorney, Agent, or Firm*—Bell, Seltzer, Park & Gibson

[57] ABSTRACT

A method and apparatus for collecting objects from a surface, especially poultry from the ground, in which the apparatus comprises, with reference to FIG. 1, a mobile unit 1, provided with a rotatable paddle device 5, 6 which is supported by arms 20, 24 allowing it to be extensible and elevatable with respect to mobile unit 1 such that it is capable of advancing above the level of objects to be collected, lowering towards a surface on which the objects are situated, entrapping the objects between itself and a conveyor system provided on the unit 1 and urging objects on to the conveyor system, the conveyor system 8, 9, 10, 11 being used for delivery of the objects to a container on a platform 14 at the rear of the mobile unit 1, the conveyors 10, 11 being capable of depositing objects by retreating from beneath the objects while advancing the conveyor surfaces thereof.

42 Claims, 8 Drawing Sheets

METHOD AND APPARATUS FOR COLLECTING AND CONVEYING OBJECTS FROM A SURFACE

FIELD OF THE INVENTION

This invention relates to a method and apparatus for collecting objects from a surface and is particularly suited to the task of catching poultry reared in a deep litter or open house situation for shipment to a desired location.

BACKGROUND OF THE INVENTION

It has been general practice to catch poultry by hand. This has proved unsatisfactory because it is labour intensive, time consuming and generally results in injury to the poultry either directly as a result of hand catching or because in attempts to evade capture the poultry collide with obstructions and each other sustaining bruising which lowers their market value.

There has been several proposals for gathering poultry by mechanical means but these have not met with commercial success.

French Patent No. 2,411,106 (7738148) discloses a tractor mounted collector for chickens having a horizontally disposed flexible bladed rotor to urge birds from the ground onto a conveyor arranged transversely to the direction of travel of the tractor and collector.

U.S. Pat. No. 3,672,335 discloses a mobile self-propelled gathering device comprising a rotatable or reciprocable pusher acting in conjunction with a plurality of conveyor means so as to first ride over the top of birds on the floor of a growing house and thereafter engage the birds and push the birds bodily in a rearward direction onto the conveyor means which extend upwardly and rearwardly of the gathering device.

In the applicant's co-pending European patent application there is disclosed collecting apparatus which comprises a mobile supporting framework mounting two elongate members adapted to be driven counter to one another and disposed with their axes parallel to one another and in use, to a supporting surface across which the framework is intended to be moved. The members define therebetween a passage and means lesser in length than the passage is deep outstand from around the members. Various embodiments are described therein but the principle in each case is that the members cooperate to carefully pick up an object from a surface, e.g. a chicken from the ground and elevate it to a plurality of conveyors for collection and shipment.

A problem identified with such apparatus is the herding or driving of poultry before the advancing apparatus which results in entrapment of lesser numbers of poultry than is theoretically possible were they to remain stationary.

In addition caging of the collected poultry until now has been a difficult and time consuming aspect of the collection and transport operation.

An object of the present invention is to provide further improvement in this art.

SUMMARY OF THE INVENTION

According to one aspect of the present invention there is provided a method of collecting objects from a surface which comprises a. advancing towards said objects a collecting apparatus comprising a mobile unit provided with a rotatable elongate member supported by support means so as to be extendible and elevatable in a forwardly direction with respect to said unit, said elongate member having a plurality of pusher members outstanding therefrom, and in spaced parallel relationship to said rotatable elongate member, the first of a series of cooperating conveyor surfaces provided on said mobile unit for conveying collected objects to a desired location, b. locating the rotatable elongate member above and beyond the objects to be collected with respect to said mobile unit, by means of support means, c. lowering the rotatable elongate member by means of said support menas to entrap the objects in a space between said pusher members and said first conveyor surface, d. reducing said space by advancing the unit and (or) retracting the rotatable member towards the unit by means of said support means whilst rotating the elongate member to cause the pusher members to urge the objects on to said first conveyor surface which is simultaneously driven in a direction counter to that of said rotatable member to carry objects arriving thereon to a further conveyor in the series, e. raising the rotatable elongate member by means of said support means at its closest limit of approach to said first conveyor, and repeating in a cycle said steps a. to e. until a desired number of said objects has been collected.

Preferably the method comprises the steps of f. collecting and weighing the objects on a conveyor surface, g. locating the weighing conveyor above a plurality of stacked load-bearing surfaces, and h. relocating the weighing conveyor whilst advancing the weighing conveyor surface to deposit the objects on one of said stacked surfaces which preferably are themselves the surfaces of stacked conveyors enabling the final steps i. of inserting the stacked load-bearing surfaces in a suitably positioned transportable container provided with load-bearing surfaces therein, and j. in the case of non-conveyors, providing object retaining means on said container and withdrawing the stacked surfaces from the container, or in the case of conveyors withdrawing the stacked conveyors from the container whilst advancing said conveyor surfaces thereof to deposit the objects on the load-bearing surfaces of the transportable container.

The advantages of this method are that driving of alarmed poultry before the apparatus is avoided because the depending pusher members screen the advancing mobile unit from the view of poultry not already entrapped between the pusher members and the mobile unit and also alarm is further reduced because the rate of retraction of the support means the elongate member and pusher members can be matched to the rate of advancement of the mobile unit.

Further according to the method of this invention injury and alarm to poultry is further obviated or mitigated by removing the conveying surface from underneath the poultry allowing them to step down onto the next conveying surface. This represents a radical change in poultry handling which previously concentrated on driving the poultry over a surface or conveying them to chutes for transfer to a further conveyor or a container.

According to a further aspect of this invention there is provided apparatus for collecting objects comprising a mobile unit having a rotatable elongate member supported by arms attached to said mobile unit, said arms providing support means enabling said member to be extendible and elevatable in a forwardly direction with reference to said mobile unit, said rotatable member having a plurality of pusher members outstanding therefrom, and in spaced parallel relationship to said rotatable elongate member, the leading edge of the first of a series of cooperating conveyor surfaces attached to the mobile unit for conveying collected objects to a desired location, said rotatable elongate member and first conveyor being adapted to be driven counter to one another, the rotatable elongate member and leading edge of the first conveyor being in use substantially parallel to a supporting surface across which the apparatus is intended to be moved, and said rotatable elongate member together with pusher members dependent therefrom, in the fully extended, non-elevated position of the member on said support means, defining in conjunction with said leading edge of the first conveyor a reducible region of containment for objects, wherefrom in use upon rotation of the elongate member and retraction thereof toward said unit objects are urged on to the first conveyor by the pusher members coming into contact therewith.

Said support means enabling said member to be forwardly extendible and elevatable with reference to said mobile unit may comprise elevatable arm parts joined at one end thereof to said unit and pivotable arm portions provided on pivots at the other end of said arm parts, said member being connected transversely to the ends of said pivotable arm portions, and drive means for operating said means.

More preferably said support means enabling said member to be forwardly extendible and elevatable with reference to said mobile unit comprises cam track means located on support arms attached to said unit 1 and driven cam follower means attached to said member, said cam track means defining a continuous path allowing said cam follower means to travel along, in a repeatable cycle, an elevatory path, a forward directional path, a decending path and a reverse directional path. Most preferably said cam track means is so located on said support arms that the rotatable member passes sufficiently close to the first conveyor as to cause the pusher means of said member to continue to act on any contained object until it is positively conveyed away therefrom by said first conveyor.

According to another aspect of the invention there is provided a conveyor system for use in the loading of collected objects into a transportable container comprising a first conveyor for conveying a feed of collected objects which are to be loaded into a transportable container, a weighing conveyor arranged in series with the first conveyor so as to receive objects conveyed thereby and connected to means for sensing the total weight of objects deposited on said weighing conveyor, a plurality of elevatable and stackable surfaces arranged in series with the weighing conveyor, drive means for transferring the weighing conveyor between a loading position adjacent the first conveyor and an off-loading position above said stackable surfaces and drive means for moving said stackable surfaces up or down to receive weighed loads of object and also for transferring said stackable surfaces from a loading position adjacent the weighing conveyor to an off-loading position within a suitably positioned purpose built transportable container capable of retaining loads of objects whilst said stackable surfaces are withdrawn. Said surfaces may be plates or trays.

Preferably each of said weighing and stackable surfaces is a conveyor capable of depositing a load by advancement of the load-carrying conveyor surface whilst the conveyor itself retracts from the off-loading position.

The conveyor system of this invention may include a regulator conveyor in series between the first conveyor in series between the first conveyor and the weighing conveyor to control the rate and distribution of the objects conveyed to the weighing conveyor.

Advantageously the conveyor surfaces are provided with projections, indentations or roughened surfaces facilitating retention of objects.

Most preferably the collecting apparatus of this invention and conveying apparatus of this invention as just described are combined in a single self-propelled track-laying mobile unit which is propelled by, and has all ancillary equipment operated by, an hydraulic system whose pumps are powered by an internal combustion engine run on LPG or diesel. For example, the invention can be powered by a 1600 cc engine producing 33 kW @ 3600 rpm using LPG as fuel which has excellent economic advantages as well as low noise levels (circa 85 decibels) which avoids alarming poultry, and reduces levels of air contamination by exhaust fumes. It is equally possible to use a diesel unit or an electric motor or any convenient power unit suitable for this purpose.

DESCRIPTION OF THE DRAWINGS

The invention will now be described in more detail with reference to the accompanying drawings in which.

DESCRIPTION OF THE PREFERRED EMBODIMENTS

EXAMPLE 1

Figure 1:
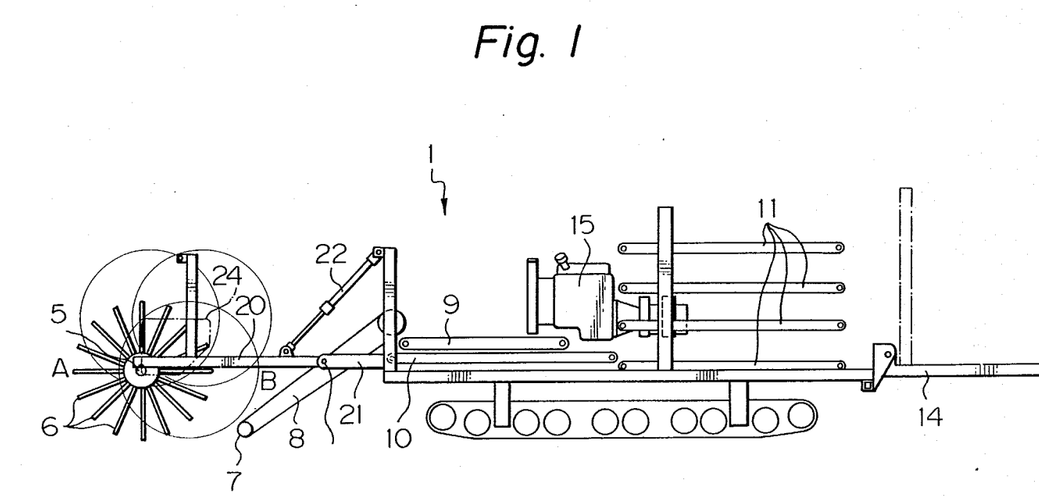
FIG. 1 is a diagrammatic side view of a preferred embodiment of this invention omitting for reasons of clarity in illustrating the invention cover panels and other parts inessential to the understanding of the invention.
Figure 2A:
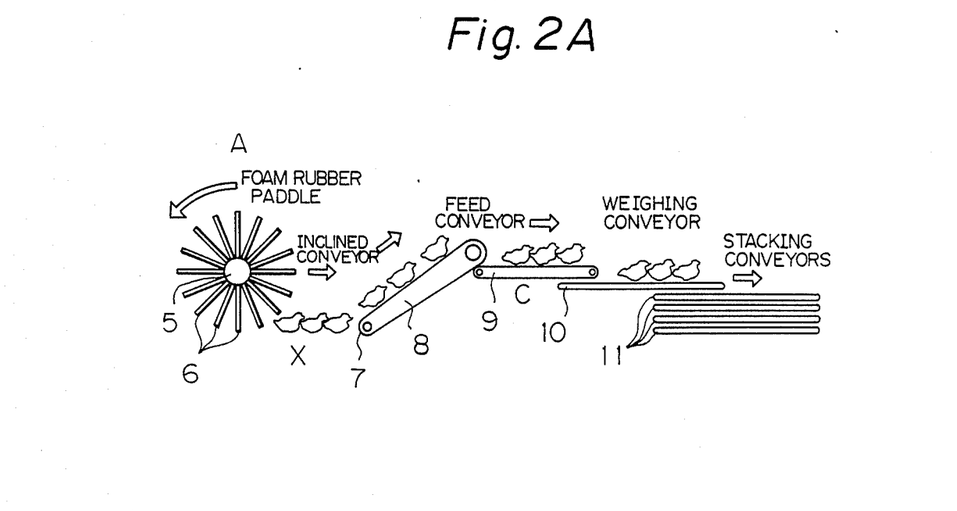
FIGS. 2(a) through to 2(h) illustrate schematically the method and operation of the apparatus of this invention.
Figure 2B:
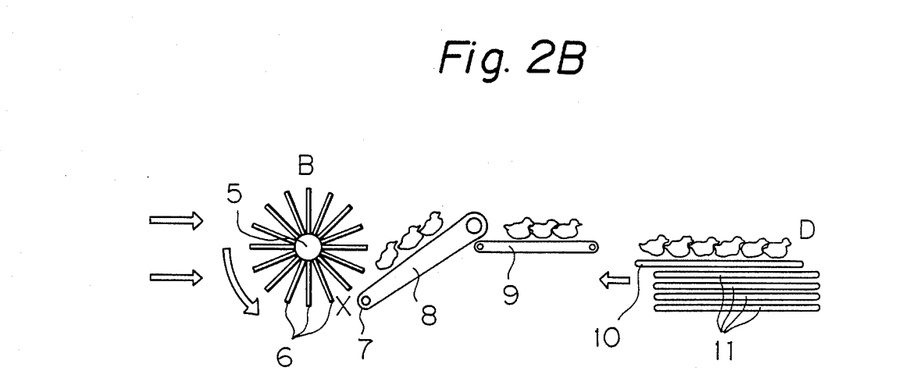
Figure 2C:
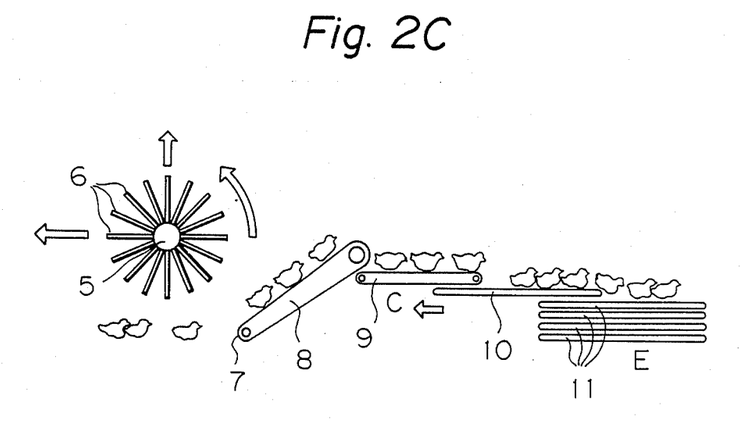
Figure 2D:
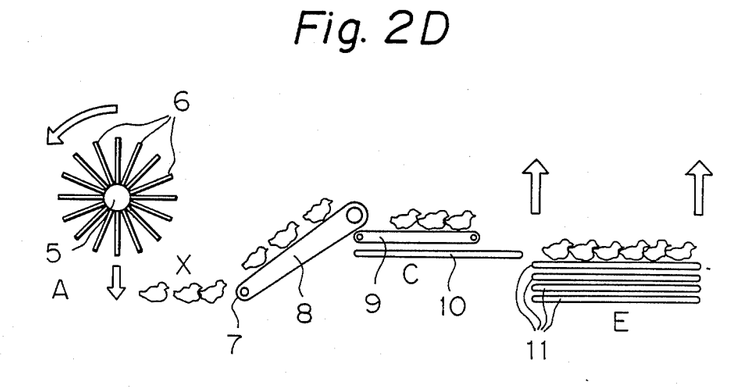
Figure 2E:
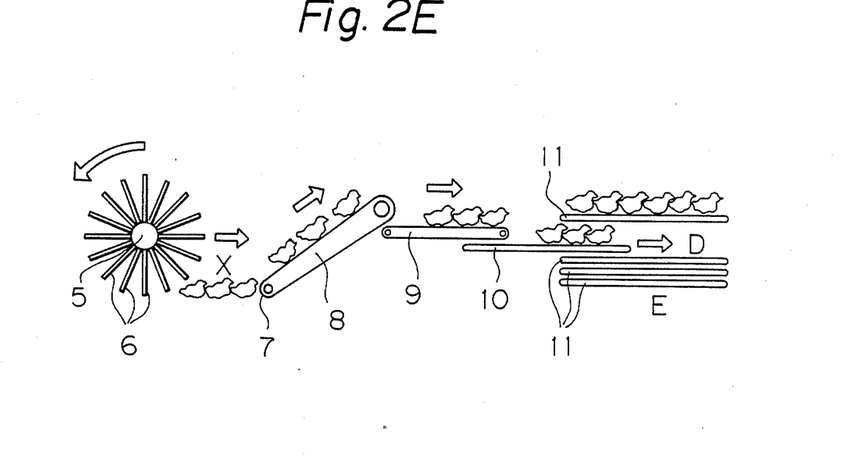
Figure 2F:
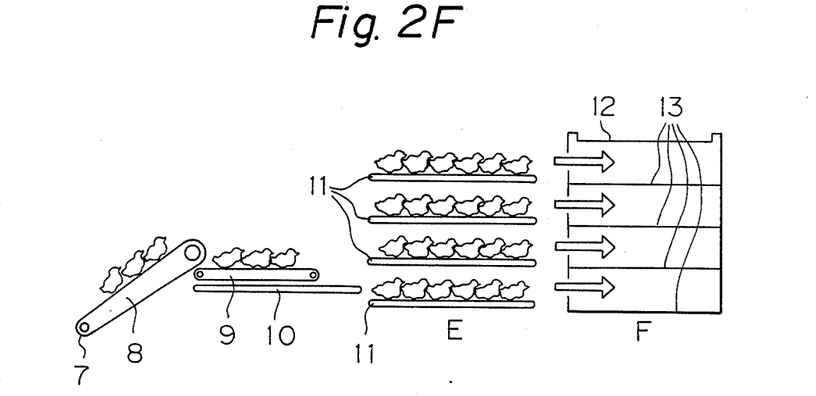
Figure 2G:
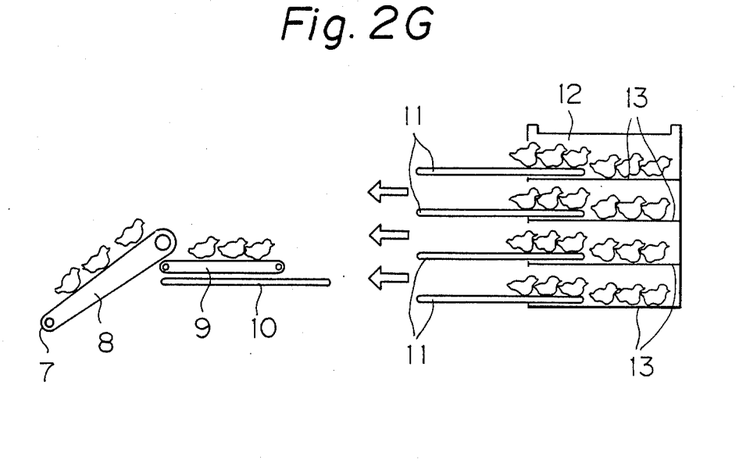
Figure 2H:
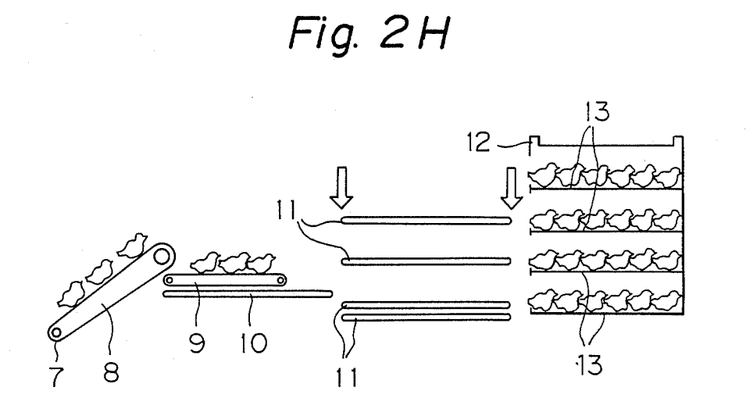
Figure 7:
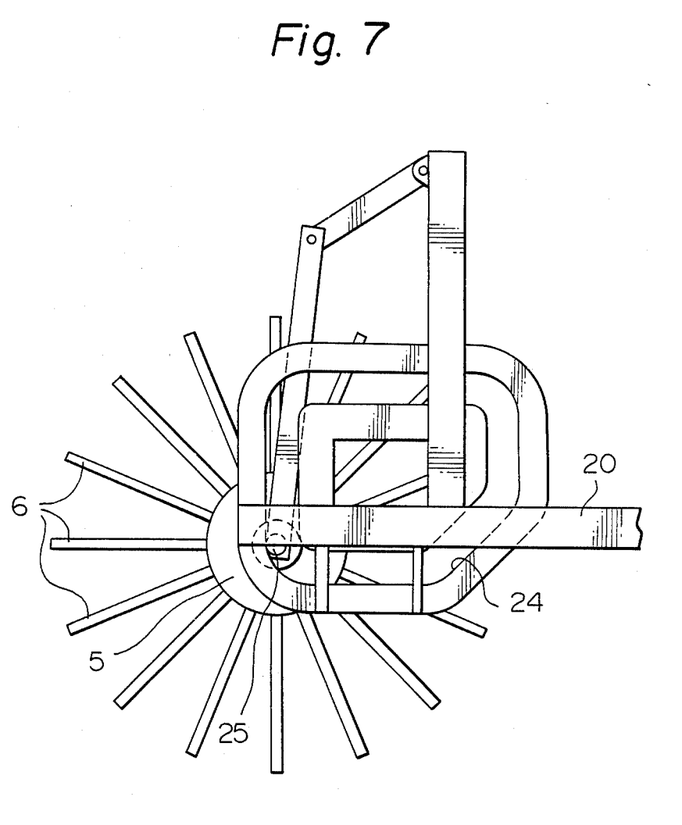
FIG. 7 is a view on an enlarged scale of the cam track and follower means used to operate the catching means of the embodiment shown in FIG. 1.

Apparatus for collecting poultry is provided in the form of a self-propelled track-laying vehicle which as illustrated in FIG. 1 comprises a mobile unit 1 having poultry collecting means mounted at the front thereof including catching means in the form of a paddle device formed from an elongate rotatable member 5 provided with a plurality of pusher members 6 outstanding therefrom which together form a rotating flexible barrier, and conveying means including in spaced parallel relationship to said rotatable elongate member 5, the leading edge 7 of a conveyor 8 which conveyor is inclined to the horizontal in the direction of travel of the conveyor 8, said rotatable member 5 and conveyor 8 being adapted to be driven counter to one another by hydraulic means (not shown), said rotatable member 5 and leading edge 7 of the conveyor 8 being in use substantially parallel to a supporting surface across which the apparatus is intended to be moved, said catching means cooperating with said conveying means to provide collecting means by virtue of the provision of a pair of support arms 20 connected to said unit 1 and located on said support arms 20, cam track means 24 with chain-driven cam follower means 25 being provided on said rotatable member 5 of the paddle device which is supported transversely between the support arms, said cam track means 24 defining means for elevating and lowering the paddle device in a continuous path allowing said cam follower means 25 to travel in a repeatable cycle for periodically repositioning the paddle device, said cycle compromising an elevatory path to a position sufficiently vertically above the surface to pass over poultry thereon, a forward directional path to a position spaced horizontally more in advance of the leading edge, a descending path to another position vertically adjacent the surface for confining poultry thereon and a reverse directional path to a position horizontally more closely spaced to said leading edge, said cam track means 24 being so located on said support arms 20 as to provide that the rotatable member 5 passes sufficiently close to the conveyor 8 as to cause the pusher means 6 of the paddle device to continue to act on any poultry contained or caught thereby and for preventing rearward movement of the pultry, until it is positively conveyed away therefrom by the conveyor 8. Thus the paddle device at the furthermost extent of its travel in the descending path of the cycle defines in conjunction with said leading edge 7 of the conveyor 8 a reducible region of containment X for poultry wherefrom in use upon rotation of the member 5 and return of same along the reverse directional path of the cycle poultry are positively induced to step onto the conveyor 8 by the pusher members 6 coming into contact therewith and remaining in contact therewith for a brief period after stepping onto the conveyor 8. The conveyor 8 is optionally provided with perches 8' but may alternatively have a roughened surface.

The poultry once on the conveyor 8 are conveyed upward to a weighing conveyor 10 arranged in series with the conveyor 8. An optional feed regulator conveyor 9 is included in series for controlling the rate and distribution of poultry conveyed to the weighing conveyor 10 by channelling them through convergent means (not shown). This weighing conveyor 10 is connected to means (not shown) for sensing the total weight of poultry deposited thereon. It is further provided with drive means (not shown) for transferring the weighing conveyor 10 between a loading position C adjacent the feed regulator conveyor 9 (in other embodiments adjacent the conveyor 8) and an off-loading position D above and adjacent a plurality of elevatable and stackable surfaces 11 (which in this case are conveyors also but could equally be plates or trays or cage floors in alternative embodiments), said stackable conveyor surfaces being arranged in series with the weighing conveyor 10, drive means (not shown) is provided for moving said stackable conveyors 11 up or down to receive weighed loads of poultry and further drive means (not shown) for transferring the stackable conveyor 11 from a loading position E adjacent the weighing conveyor 10 to an off-loading position F within a suitable positioned transportable module or cage 12, each of said weighing and stackable conveyors being capable of depositing a load of poultry by advancement of the load-carrying surface of the conveyor whilst the conveyor itself is withdrawn from the off-loading position thereby allowing the poultry to step down onto the next conveyor or cage surface. This provides optimum loading and distribution of the poultry.

In this embodiment all conveyors and the mobile unit itself are driven hydraulically by a hydraulic system deriving its power from pumps driven by an internal combustion engine using LPG fuel (1600 cc, 4 cylinder engine producing some 33 kW @ 3600 rpm) which achieves a maximum noise level of circa 85 dba @ 2200 rpm with low levels of toxic exhaust fumes. The whole power unit being represented schematically as 15 in FIG. 1.

In use the unit 1 is maneuvered into a poultry house and advanced towards the poultry whilst the catcher and conveyor mechanisms are activated. The paddle device 5, 6 rides up on the cam track to an elevated position above the height of the poultry and after passing over a group of poultry it descends beyond the poultry group and confines that group in the area between the paddle device and the leading edge 7 of the coveyor 8. At the operator's option the unit may continue to advance at the same rate whilst the paddle device reverses towards the unit or the respective motions of the paddle device and unit can be controlled such that with respect to the poultry one or other is apparently stationary. Whilst collecting the poultry in this manner the paddle device is rotated slowly so that as the area of confinement becomes restricted the poultry are induced to step onto the counter-rotating conveyor 8 by the pusher members 6 contacting the poultry from above and to the rear.

The conveyor 8 carries the poultry on to a regulator conveyor 9 which brings the poultry together at a controlled rate for weighing on the weighing conveyor 10.

The weighing conveyor surface does not rotate during filling but in response to feedback from the weight sensing menas advances at a steady rate or in incremental stages and at a predetermined maximum load of poultry, the weighing conveyor 10, which has been advanced to a position adjacent a stack of further conveyors 11, unloads the poultry by revolving the conveyor surface and withdrawing to the start position. Whilst the weighing conveyor 10 returns to the start position, the loaded stackable conveyor 11 is elevated and an empty conveyor 11 takes its place to receive the next load. Once all the stackable conveyors are loaded, they are inserted into a transporter module or cage 12 located on rear platform 14, said module or cage having load-bearing surfaces 13 equivalent in number to the number of conveyors 11 in the stack. The conveyors 11 are unloaded by rotation of the conveyor surfaces whilst the conveyors 11 are withdrawn from the module or cage 12.

The loaded module or cage 12 can then be lifted onto a transporter by a forklift truck, crane or the like.

The catching mechanism of this embodiment can be raised for ease of maneuvering the vehicle onto a transporter, by means of hydraulic means 22 fixed to the support arms 20 which are connected via pivots 23 and fixed members 21 to the unit 1.

EXAMPLE 2

Figure 3:
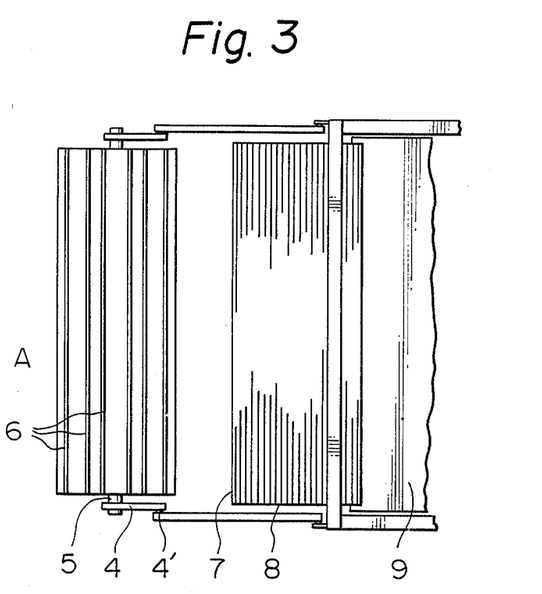
FIG. 3 is a plan view of the main parts of an alternative catching mechanism to that shown in the embodiment of FIG. 1.
Figure 4:
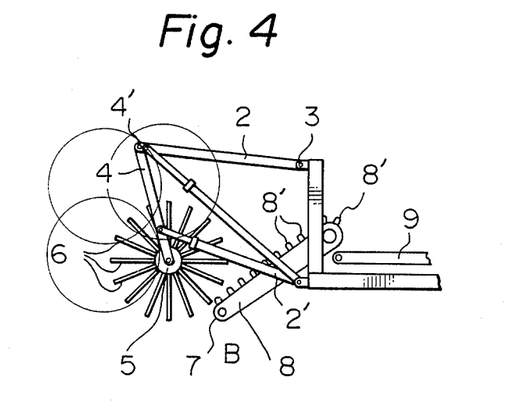
FIG. 4 is a side view of the catching mechanism shown in FIG. 3.

Apparatus for collecting broiler chickens by means of alternating catching means as shown in FIGS. 3 and 4, comprises a self-propelled track-laying mobile unit 1 provided with collecting means including a pair of elevatable arms 2 joined to said unit at 3 and provided with pivots 4' enabling pivotable arm portions 4 of the arms 2 to be drawn back from an extended reach position A to a retracted position B by hydraulic means 2' and at the ends of said pivotable portions 4 there is supported transversely therebetween an elongate member 5 so mounted as to be rotatable and driven hydraulically, and provided upon said elongate member 5 a plurality of pusher members 6 of a resilient or pressure-deformable material such as foam rubber outstanding therefrom to form a paddle device, and in spaced parallel relationship to said rotatable elongate member 5, the leading edge 7 of a conveyor 8 which conveyor is inclined to the horizontal in the direction of travel of the conveyor 8, said rotatable member 5 and conveyor 8 being adapted to be driven counter to one another by hydraulic means (not shown), said rotatable member 5 and leading edge 7 of the conveyor 8 being in use substantially parallel to a supporting surface across which the apparatus is intended to be moved, and said rotatable member 5 together with the pusher members 6 dependent therefrom, in the fully extended, non-elevated position A of the arms 2, 4, defining in conjunction with said leading edge 7 of the conveyor 8 a reducible region of containment X for broiler chickens, wherefrom in use upon rotation of the member 5 and retraction of the arm portions 4 broiler chickens are encouraged to step onto the conveyor 8 by the pusher members 6 coming into contact therewith. The conveyor 8 is optionally provided with perches 8' for the chickens. The chickens once on the conveyor 8 are conveyed upwards towards a weighing conveyor 10 arranged in series with the conveyor 8. In this embodiment an optional feed regular conveyor 9 is included in series for controlling the rate and distribution of chickens conveyed to the weighing conveyor 10 by channelling them through convergent means (not shown). This weighing conveyor 10 is connected to means (not shown) for sensing the total weight of chickens deposited thereon.

It is further provided with drive means (not shown) for transferring the weighing conveyor 10 between a loading position C adjacent the feed regulator conveyor 9 (in other embodiments which omit the conveyor 9 it lies adjacent the conveyor 8) and an off-loading position D above and adjacent a plurality of elevatable and stackable conveyors 11 arranged in series with the weighing conveyor 10, drive means (not shown) is provided for moving said stackable conveyors 11 up or down to receive weighed loads of chickens and further drive means (not shown) for transferring the stackable conveyors 11 from a loading position E adjacent the weighing conveyor 10 to an off-loading position F within a suitably positioned purpose built transportable cage 12, each of said weighing and stackable conveyors being capable of depositing a load of chickens by advancement of the load-carrying conveyor surface whilst the conveyor itself retreats from the off-loading position thereby allowing the chickens to simply step down onto the next conveyor or cage surface.

In this embodiment all conveyors and the mobile unit itself are driven hydraulically by a hydraulic system deriving its power from pumps driven by an internal combustion engine using LPG fuel (1600 cc 4 cylinder engine producing some 33 kW @ 3600 rpm) which achieves a noise level circa 85 dba @ 2200 rpm. The whole power unit being represented schematically as 15 in FIG. 1.

In use the unit 1 is maneuvered into a broiler house and advanced towards the chickens whilst the catcher and conveyor mechanisms are activated. The paddle device is elevated above the height of the chickens and extended to reach beyond a group of chickens by means of the arms 2, 4 then lowered to entrap a number of chickens in the region between the paddle device and the leading edge 7 of the conveyor 8. As the unit 1 is advanced the paddle device is rotated slowly and retracted towards the unit 1 whereupon pusher members 6 contact the chickens and because of the reducing space available to the chickens they are encouraged to step onto the conveyor 8. Once on the conveyor 8 the chickens are conveyed via a regulator conveyor 9 which brings the chickens together at a controlled rate for weighing on the weighing conveyor 10. The weighing conveyor surface does not rotate during filling but the conveyor itself moves out from under the feed conveyors 8, 9 as the chickens step on to it. When the sensors attached to the weighing conveyor 10 detect a predetermined weight of chickens thereon, the chickens are transferred to one of the plurality of stackable conveyors 11 by advancing the conveyor surface by rotation whilst the conveyor 10 itself retreats from above the stackable conveyors 11 allowing the chickens to step down on to the stackable conveyor surface. As the weighing conveyor 10 returns for the next load of chickens the loaded stackable conveyor is moved to a different position in the stack and an empty stackable conveyor is brought into a load receiving position. Once all the conveyors 11 in the stack are filled the unit 1 is provided with a platform 14 for receiving a cage 12 or alternatively is maneuvered into position before a cage 12 having loadbearing surfaces 13 equivalent in number to the number of conveyors 11 in the stack. Then the stack of conveyors 11 is located within the cage, each conveyor being located above a load-bearing surface in the cage 12. The conveyors 11 are unloaded by rotation of the conveyor surfaces whilst the conveyors 11 are withdrawn from the case 12 whereupon chickens step down on to the load-bearing surfaces 13 of the cage 12 as the conveyor surface is removed from beneath them. This system provides the optimum loading weight and an even distribution of poultry on the load bearing surfaces 13.

The loaded cage 12 can be lifted on to a transporter by means of a forklift truck or crane or the like. Thus in this way one machine operator and one forklift operator can handle in the region of say 70 kg per module or cage load surface per minute, which using a module of 4 trays each approximately 1200 mm × 1400 mm in size in the module means roughly 8,500 chickens, weighing about 4.3 lb (2 kg) each, per hour depending on the crating system used, the weight of the chickens and the forklift logistics support. This contrasts with the 600–1000 chickens per hour that can be caught by conventional hand catching methods with two operators, not to mention the attendant injury risks of manual handling.

Downgrading or reduction in quality of product due to mishandling which normally costs the poultry industry in the United Kingdom around 30 million stg per annum can be reduced to virtually zero because the chickens are untouched by hand until they reach the processing plant.

It will be appreciated that whereas one embodiment only has been described and illustrated, this is merely one of a number of variations possible. For example, the weighing conveyor 10 need not necessarily be filled whilst emerging from beneath the feed conveyors 8, 9 but may instead be located adjacent the end of the feed conveyors 8, 9 and filled by rotating the conveyor surface for a suitable period of time. It may then be emptied by locating it above the stack of conveyors 11 and relocating the conveyor 10 whilst rotating the conveyor surface as before. Similarly whereas in the embodiment illustrated stacked conveyors are filled and moved upwards, alternative constructions are feasible wherein the stack begins in an elevated position and is lowered when filled, to the bed of the mobile unit 1.

Figure 5:
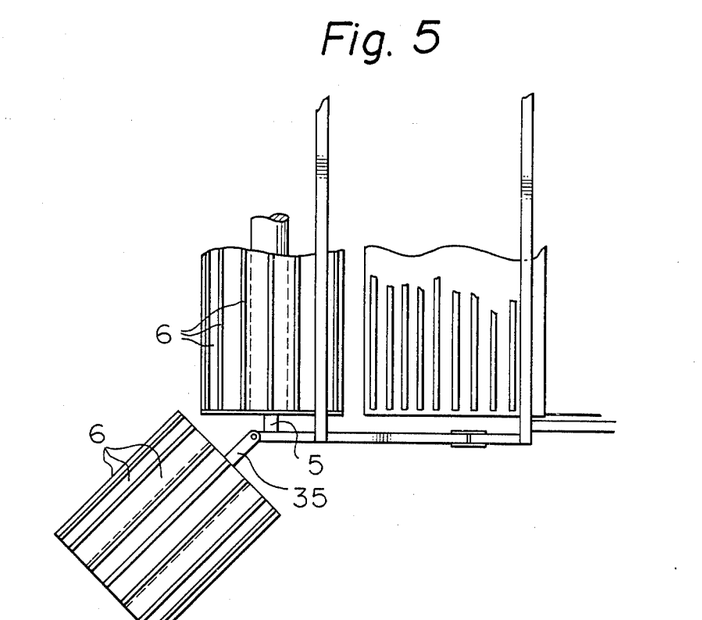
FIG. 5 is a plan view of part of the catching mechanism of the embodiment as shown in FIG. 1 but including a further modification in the form of additional catching means of outriggers.
Figure 6:
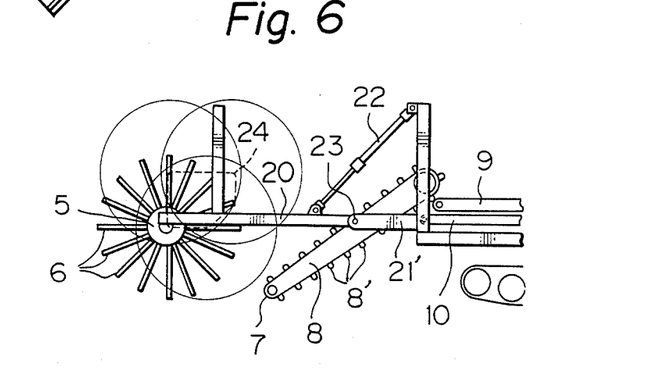
FIG. 6 is a side view of part of the embodiment shown in FIG. 1 and illustrating a preferred conveyor surface which is provided with perches.

It is possible to improve containment in the region X by providing additional paddle devices using rotatable members similar to 5 with pusher means 6 on outriggers 35 to sweep left and right of the rotatable member 5. These may be alternatively brush devices or conveyor devices rotating in the same plane as the member 5 or at a suitable angle thereto, even for example in a vertical plane with reference to the surface across which the apparatus is travelling.

The unit operations of the apparatus are advantageously monitored and controlled by means of electronic circuitry.

The method of use of the apparatus will be further explained as follows:

The method of the invention has the following stages:

1. The Catching Function

The catching function is performed by means to entrap and collect live birds and comprises an entrapment roller and an inclined first conveyor, the first conveyor forming conveyor means.

The entrapment roller consists of a paddle wheel, the width of the inclined conveyor and approximately the width of the complete vehicle. This wheel is equipped with soft, rubber paddles which are slowly rotated. The entrapment roller is moved forward from the machine above the birds on the floor, and then lowered into them, to a level where the paddles just touch the floor. The entrapment roller may be drawn slowly towards the machine or alternatively held stationary (lateral movement) while the machine approaches. This is a particularly important feature since it avoids alarming birds not yet entrapped by but close to the machine. Either way relative movement between the entrapment roller and the machine encourages the birds onto the inclined conveyor, which is equipped with short rubber "flights" to provide "perches" for the birds. Movement of the inclined conveyor at linear speed which approximates to the forward speed of the machine provides a gentle and unbroken route for the birds from the poultry house floor into the vehicle.

The entrapment can be utilized in conjunction with two elongate rotatable members adapted to be driven counter to one another and disposed with their axes opposite to one another, the members defining therebetween a passage in which and through which the birds are caught and along which the caught birds are elevated or transposed. Alternatively it can be used in conjunction with elongate rotatable members adapted to be driven counter to one another and disposed with their axes parallel to one another and can be used either substantially parallel to the ground or in a vertical relationship to the ground or at an incline to the ground.

2. The Weighing Function

The birds pass from the inclined first conveyor to means to reveive the birds and to distribute them into a stacking arrangement, the means comprising a second conveyor which is capable of rotation and is used as a reservoir to feed birds onto a weighing conveyor.

The weighing conveyor does not rotate during filling, but moves laterally out from under the primary conveyor as birds pass onto it. By continually weighing the weighing conveyor and moving it laterally at a related speed or in a number of moves of related distance, a known weight of birds may be placed on the weighing conveyor and at an even density.

3. The Stacking Function

The vehicle is equipped with the stacking arragement of four (or more or less as required) horizontal conveyors capable of rotation, and lateral movement as a unit.

These conveyors "nest" low in the vehicle on top of each other and are capable of controlled vertical movement. With the conveyors "nested", the weighing conveyor travels out over the top conveyor as birds are passing to it from the second conveyor. When the weighing conveyor is full, it is extended over the top stacking coveyor. By rotating the weighing conveyor and simultaneously withdrawing it at a lateral speed corresponding to the surface speed of the conveyor belt, the birds are transferred from the weighing conveyor to the top stacking conveyor.

This conveyor now moves upwards exposing the top surface of the second stacking conveyor, which is then in turn filled from the weighing conveyor. Retraction of the weighing conveyor allows vertical movement of both first and second conveyors in the vertical stack, exposing the top surface of the third stacking conveyor, etc.

In this way a "stack" may be built up of four or more horizontal conveyors, spaced vertically above each other, and each carrying a known weight of birds at a known density.

It should be noted that at this time the stacking conveyors have not rotated and have not fulfilled a conveyor function, and could equally be replaced by horizontal floors or plates.

4. The Docking Function

The rear of the machine is equipped with a platform to support a module or tiered cage unit and so provided with locations that the module, when placed on the platform from a forklift truck, is in a fixed position relative to the stacking conveyors within the vehicle.

5. The Transfer Function

When the module is positioned on its docking platform and doors of the module opened, the stack conveyors, spaced vertically above each other at distances to correspond with the floors of the module or cage unit and each carrying a known weight of birds (see 3. above), move laterally as a unit, so that the horizontal conveyors carrying the birds enter the module, each conveyor above its corresponding floor in the module.

By rotating the stacking conveyors and simultaneously withdrawing them at a lateral speed corresponding to the surface speed of the conveyor belts, the birds are transferred from the stacking conveyors to the floors of the module ensuring an even distribution of birds thereon.

In the case of using fixed floors, the doors (top hung) of the module are first closed and the floors withdrawn.

It will be understood that whereas the invention finds its most advantageous use in the poultry industry, it can be used for collection of inaminate objects as well.

What is claimed is:

1. A method of collecting objects from a surface which comprises the steps of:
   (a) advancing towards said objects a collecting apparatus comprising a mobile unit provided with a rotatable elongate member supported by support means so as to be extensible and elevatable in a forward direction with respect to said unit, said elongate member having a plurality of pusher members outstanding therefrom, and in spaced parallel relationship to said rotatable elongate member, the first of a series of cooperating conveyor surfaces provided on said mobile unit for conveying collected objects to a desired location;
   (b) locating the rotatable elongate member above and beyond the objects to be collected with reference to said mobile unit by means of said support means;
   (c) lowering the rotatble elongate member by means of said support means to entrap the objects in a space between said pusher members and said first conveyor surface;
   (d) reducing said space by advancing the unit and/or retracting the rotatable member by means of said support means whilst rotating the elongate member to cause the pusher members to urge the objects on to said first conveyor surface which is simultaneously driven in a direction counter to that of said rotatable member to carry arriving thereon to a further conveyor in the series;
   (e) raising the rotatable elongate member by means of said support means at its closest limit of approach to said first conveyor; and
repeating in a cycle said steps (a) to (e) until a desired number of said objects has been collected.

2. A method according to claim 1 wherein said method further comprises the steps of:
   (f) collecting and weighing the objects on a conveyor surface;
   (g) locating the weighing conveyor adjacent a plurality of stacked load-bearing surfaces; and
   (h) relocating the weighing conveyor whilst advancing the weighing conveyor surface to deposit the objects on one of said stacked surfaces.

3. A method according to claim 2 wherein said stacked load-bearing surfaces are the conveyor surfaces of a plurality of stacked conveyors and said method comprises the additional steps (i) of inserting the stacked load-bearing surfaces of said stacked conveyors in a suitably positioned transportable container provided with load-bearing surfaces therein and (ii) with drawing said stacked conveyor whilst advancing said conveyor surfaces thereof to deposit the objects on the load-bearing surfaces of the transportable container.

4. Apparatus for collecting objects comprising a mobile unit having a rotatable elongate member, said elongate member having a plurality of resilient pusher members outstanding therefrom, and in spaced parallel relationship to said rotatable elongate member, the leading edge of a conveyor, said rotatable member and first conveyor being adapted to be driven counter to one another, said rotatable member and leading edge of the first conveyor being in use substantially parallel to a supporting surface across which the apparatus is intended to be moved, characterized in that the rotatable elongate member is supported by support means attached to said mobile unit, said support means enabling said rotatable member to be extensible and elevatable in a forward direction with reference to said mobile unit, said rotatable member together with the pusher members dependent therefrom, in the fully extended, non-elevated position of the rotatable member on said support means, defining in conjunction with said leading edge of the conveyor a reducible region of containment for objects, wherefrom in use upon rotation of the rotatable member and retraction thereof toward said unit, objects are urged on to the conveyor by the pusher members coming into contact therewith.

5. Apparatus according to claim 4 wherein said support means enabling said rotatable member to be forwardly extensible and elevatable with reference to said mobile unit comprises elevatable arm parts joined at one end thereof to said unit and pivotable arm portions provided on pivots at the other end of said arm parts, said rotatable member being connected transversely to the ends of said pivotable arm portions and drive means for operating said support means.

6. Apparatus according to claim 4 wherein said support means enabling said rotatable member to be forwardly extensible and elevatable with reference to said mobile unit comprises cam track means located on support arms attached to said unit and driven cam follower means attached to said rotatable member, said cam track means defining a continuous path allowing said cam follower means to travel along, in a repeatable cycle, an elevatory path, a forward directional path, a descending path, and a reverse directional path.

7. Apparatus according to claim 6 wherein said cam track means is so located on said support arms that the rotatable member passes sufficiently close to the first conveyor as to cause the pusher means of said rotatable member to continue to act on any contained object until it is positively conveyed away therefrom by said first conveyor.

8. Apparatus according to claim 4 further characterized in that the conveyor is the first in a series of conveyors comprising a first conveyor for conveying a feed of collected objects which are to be loaded into a transportable container, a weighing conveyor arranged in series with the first conveyor so as to receive objects conveyed thereby and connected to means for sensing the total weight of objects deposited on said weighing conveyor, a plurality of elevatable and stackable conveyors arranged in series with the weighing conveyor, drive means for transferring the weighing conveyor between a loading position adjacent the first conveyor and an off-loading position above said stackable conveyors and drive means for moving said stackable conveyors up or down to receive weighed loads of objects and also for transferring said stackable conveyor from a loading position adjacent the weighing conveyor to an off-loading position within a suitably positioned purpose built transportable container, each of said weighing and stackable conveyors being capable of depositing a load by advancement of the load-carrying conveyor surface whilst the conveyor itself retreats from the off-loading position.

9. Apparatus according to claim 8 wherein a regulator conveyor is provided in series between the first conveyor and the weighing conveyor to control the rate and distribution of the objects conveyed to the weighing conveyor.

10. Apparatus according to claim 9 wherein the regulator conveyor is provided with guide means forming a converging path in the direction of travel of the conveyor surface thereof.

11. Apparatus according to claim 4 wherein the mobile unit is a self-propelled track-laying vehicle.

12. Apparatus according to claim 4 wherein the vehicle is provided with a stowable platform for supporting a container.

13. Apparatus according to claim 4 wherein electronic circuitry is provided to control operation of the apparatus.

14. Apparatus according to claim 4 wherein a hydraulic system is used to power all drive mechanisms in the apparatus.

15. A conveyor system for use in the loading of collected objects into a transportable container comprising a first conveyor for conveying a feed of collected objects which are to be loaded into a transportable container, a weighing conveyor arranged in series with the first conveyor so as to receive objects conveyed thereby and connected to means for sensing the total weight of objects deposited on said weighing conveyor, a plurality of elevatable and stackable surfaces arranged in series with the weighing conveyor, drive means for transferring the weighing conveyor between a loading position adjacent the first conveyor and an off-loading position above said stackable surfaces and drive means for moving said stackable surfaces up or down to receive weighed loads of objects and also for transferring said stackable surfaces from a loading position adjacent the weighing conveyor to an off-loading position within a suitably positioned transportable container, said weighing conveyor being capable of depositing a load by advancement of the load carrying conveyor surface while the conveyor itself retreats from the off-loading position.

16. The conveyor system of claim 15 wherein there is provided a regulator coveyor in series between the first conveyor and the weighing conveyor to control the rate and distribution of the objects conveyed to the weighing conveyor.

17. The conveyor system of claim 16 wherein the regulator conveyor is provided with guide means defining a convergent path in the direction of travel of the conveyor surface thereof.

18. The conveyor system of claim 15 wherein said stackable surfaces are conveyors which are each capable of depositing a load by advancement of the load-carrying surface whilst the conveyor itself retreats from the off-loading position.

19. The conveyor system of claim 15 wherein the conveyor surfaces of any one of the conveyors are provided with projections, indentations or roughened surfaces.

20. The conveyor system of claim 15 wherein said system is mounted on a self-propelled vehicle.

21. The conveyor system of claim 20 wherein said vehicle is provided with object collecting apparatus comprising a rotatable elongate member having a plurality of resilient pusher members outstanding therefrom, said rotatable member being supported in a spaced parallel relationship to the loading edge of the first conveyor by support means attached to said vehicle, said support means enabling said rotatable member to be extensible and elevatable in a forwardly direction with reference to said vehicle such that said rotatable member together with the pusher member dependent therefrom, in the fully extended, non-elevated position of the rotatable member on said support means define in conjunction with said leading edge of the conveyor a reducible region of containment for objects wherefrom in use upon rotation of the rotatable member and retraction thereof towards said unit objects are urged on to the conveyor by the pusher members coming into contact therewith.

22. The conveyor system of claim 21 wherein said support means enabling said rotatable member to be forwardly extensible and elevatable with reference to said mobile unit comprises elevatable arms parts joined at one end thereof to said unit and pivotable arm portions provided on pivots at the other end of said arm parts, said rotatable member being connected transversely to the ends of said pivotable arm portions, and drive means for operating said means.

23. The conveyor system of claim 21 wherein said support means enabling said rotatable member to be forwardly extensible and elevatable with reference to said mobile unit comprises cam track means located on support arms attached to said unit and driven cam follower means attached to said rotatable member, said cam track means defining a continuous path allowing said cam follower means to travel along, in a repeatable cycle, an elevatory path, a forward directional path, a descending path and a reverse directional path.

24. The conveyor system of claim 23 wherein said cam track means is so located on said support arm that the rotatable member passes sufficiently close to the first conveyor as to cause the pusher members of said rotatable member to continue to act on any contained object until it is positively conveyed away therefrom by said first conveyor.

25. The coveyor system of any one of claims 15–24 wherein the system is driven by a hydraulic system.

26. The conveyor system of claim 25 wherein the hydraulic system is operated by pumps deriving power from an internal combustion engine using LPG as fuel.

27. The conveyor system of claim 25 wherein an electronic circuitry is provided to control the hydraulic system.

28. A harvesting device for gathering poultry from a poultry carrying surface such as the floor of a broiler house and for conveying the gathered poultry to a transportable container such as a coop or a cage, said device comprising:
    a mobile chassis for being movably advanced along a poultry-carrying surface;
    a conveyor system having a poultry-receiving leading edge for being positioned adjacent the poultry-carrying surface and a loading portion for conveying poultry along said chassis and to a transportable container;
    a rotating flexible barrier carried by said chassis and spaced in advance of said leading edge of said conveyor system for moving poultry which are positioned on a poultry-carrying surface spaced in advance of said leading edge along that surface towards said leading edge in a direction opposite the advancement of said mobile chassis; and means for periodically repositioning said rotating flexible barrier with respect to said poultry carrying surface and said leading edge of said conveyor system.

29. A harvesting device according to claim 28 wherein said means for moving poultry along a surface further comprises means for preventing rearward movement of poultry on a surface in the direction away from the advancement of said mobile chassis.

30. A harvesting device according to claim 28 wherein said rotating flexible barrier comprises a rotatable elongate member having a plurality of resilient pusher members outstanding therefrom and in spaced parallel relation to said rotatable elongate member.

31. A harvesting device according to claim 30 and futher comprising means for being positioned closely adjacent a poultry carrying surface and laterally from said leading edge for moving poultry on a poultry carrying surface from positions lateral of said leading edge to positions more directly in advance of said leading edge of said conveyor system.

32. A harvesting device according to claim 31 wherein each of said laterally positioned poultry moving means comprises an elongate rotatable member having a plurality of resilient pusher members outstanding therefrom and in spaced parallel relation to said rotatable elongate member.

33. A harvesting device according to claim 28 further comprising means for confining poultry between said poultry-moving means and said leading edge of said conveyor.

34. A harvesting device according to claim 28 further comprising means for periodically repositioning said poultry moving means along a poultry carrying surface to thereby encourage poultry on the surface to move toward said leading edge of said conveyor system.

35. A harvesting device according to claim 28 wherein said means for periodically repositioning said rotating flexible barrier:
- means for positioning said rotating flexible barrier above a poultry carrying surface and a predetermined distance in advance of said leading edge of said conveyor;
- means for lowering said rotating flexible barrier toward the poultry carrying surface to thereby confine any poultry on the surface between said leading edge and said rotating flexible barrier;
- means for reducing the predetermined distance between said rotating flexible barrier and said leading edge to thereby encourage poultry confined on the surface to move towards said leading edge of said conveyor system; and
- means for repositioning said rotating flexible barrier above the poultry carrying surface and at said predetermined distance in advance of said leading edge.

36. A harvesting device according to claim 28 further comprising means for raising and lowering said rotating flexible barrier in relation to a poultry-carrying surface whereby the raising and lowering of said rotating flexible barrier urges poultry on a surface to move toward said leading edge.

37. A harvesting device for gathering poultry from a poultry carrying surface such as the floor of a broiler house and for conveying the gathered poultry for loading into a transportable container such as a coop or a cage, said device comprising:
- a mobile chassis adapted to advance along a poultry carrying surface;
- a conveyor system having a poultry receiving leading edge adapted to be positioned adjacent the poultry carrying surface;
- retractable confining means carried by said chassis and movable in a periodically repeating path with respect to said poultry carrying surface and said leading edge of said conveyor system, said path being defined by a first position horizontally along said surface from an initial position more advanced from said leading edge to a position adjacent said leading edge, a second portion vertically upwardly from said leading edge to a position above said leading edge, a third portion horizontally above said surface to a position advanced from said leading edge, and a fourth portion vertically downwardly to said surface to said initial position more advanced from said leading edge.

38. A harvesting device according to claim 37 further comprising means for rotating said retractable confining means to urge poultry on said poultry carrying surface toward the leading edge of said conveyor system.

39. A method of gathering poultry from a poultry carrying surface such as the floor of a broiler house and for conveying the gathered poultry to a transportable container such as a coop or a cage, said method comprising:
- advancing a mobile chassis having a poultry receiving conveyor system along a poultry carrying surface with a leading edge of the conveyor system positioned closely adjacent the poultry carrying surface;
- positioning a movable, generally flexible barrier adjacent the poultry carrying surface and in advance of the leading edge of the conveyor system while leaving a portion of the surface open between the flexible barrier and the leading edge to confine poultry between said flexible barrier and the leading edge of the conveyor;
- periodically repositioning the flexible barrier with respect to the poultry carrying surface and the leading edge of the conveyor system; and
- rotating the flexible barrier in a manner which encourages poultry on the surface to move towards the leading edge of the conveyor system.

40. A method according to claim 39 wherein the step of imparting motion to the flexible barrier comprises periodically repositioning the flexible barrier with respect to the poultry carrying surface and the leading edge of the conveyor system.

41. A method according to claim 39 wherein the step of imparting motion to the flexible comprises rotating the flexible barrier in a manner which encourages poultry on the surface to move towards the leading edge of the conveyor system.

42. A method according to claim 39 wherein the step of imparting motion to the flexible barrier comprises:
- postioning the flexible barrier above the poultry carrying surface and at a predetermined distance in advance of the leading edge of the conveyor system;
- lowering the flexible barrier toward the poultry carrying surface to confine poultry on the surface between the flexible barrier and the leading edge of the conveyor system;
- reducing the predetermined distance between the flexible barrier and the leading edge of the conveyor system to encourage poultry on the surface to move towards the leading edge; and
- repositioning the flexible barrier above the poultry carrying surface and at the same predetermined distance in advance of the leading edge of the conveyor system.

* * * * *